(12) United States Patent
Li

(10) Patent No.: US 11,962,932 B2
(45) Date of Patent: Apr. 16, 2024

(54) VIDEO GENERATION BASED ON PREDETERMINED BACKGROUND

(71) Applicant: BEIJING BYTEDANCE NETWORK TECHNOLOGY CO., LTD., Beijing (CN)

(72) Inventor: Cheng Li, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/882,499

(22) Filed: Aug. 5, 2022

(65) Prior Publication Data

US 2022/0377259 A1 Nov. 24, 2022

Related U.S. Application Data

(63) Continuation of application No. PCT/CN2021/083405, filed on Mar. 26, 2021.

(30) Foreign Application Priority Data

Apr. 7, 2020 (CN) .......................... 202010266623.9

(51) Int. Cl.
*H04N 5/272* (2006.01)
*H04N 5/265* (2006.01)
(Continued)

(52) U.S. Cl.
CPC ............. *H04N 5/272* (2013.01); *H04N 5/265* (2013.01); *H04N 23/632* (2023.01); *H04N 23/667* (2023.01)

(58) Field of Classification Search
CPC ....... H04N 5/232933; H04N 5/232935; H04N 5/262; H04N 5/2621; H04N 5/265;
(Continued)

(56) References Cited

U.S. PATENT DOCUMENTS

2005/0140802 A1 6/2005 Nam
2005/0212945 A1* 9/2005 Shirakawa ............. H04N 5/272
348/333.12
(Continued)

FOREIGN PATENT DOCUMENTS

CN 101543058 A 9/2009
CN 101783889 A 7/2010
(Continued)

OTHER PUBLICATIONS

International Patent Application No. PCT/CN2021/083405; Int'l Search Report; dated May 26, 2021; 2 pages.
(Continued)

*Primary Examiner* — Paul M Berardesca
(74) *Attorney, Agent, or Firm* — BakerHostetler

(57) ABSTRACT

The present disclosure provides a video processing method and apparatus, an electronic device, and a non-transitory computer readable storage medium. The method includes: displaying, when a predetermined application program enters a shooting mode, a predetermined shooting interface in a current interface of the application program, the shooting interface having a predetermined initial background; obtaining an image frame of a target object and the initial background; combining the image frame as a foreground with the initial background for displaying in the shooting interface; starting, in response to receiving a first shooting start instruction, generation of video data based on the image frame and the initial background; and stopping, in response to receiving a first shooting stop instruction, generation of video data to obtain first video data as generated.

18 Claims, 14 Drawing Sheets

(51) Int. Cl.
*H04N 23/63* (2023.01)
*H04N 23/667* (2023.01)

(58) Field of Classification Search
CPC .................. H04N 5/272; H04N 5/275; H04N 23/63–635; G06T 7/194
See application file for complete search history.

(56) References Cited

U.S. PATENT DOCUMENTS

| | | | | |
|---|---|---|---|---|
| 2011/0193993 | A1* | 8/2011 | Yeom | H04N 21/42204 348/E5.022 |
| 2013/0061175 | A1* | 3/2013 | Matas | G06F 3/04847 715/810 |
| 2013/0120602 | A1* | 5/2013 | Huang | H04N 5/23229 348/E5.024 |
| 2014/0152873 | A1* | 6/2014 | Troxel | H04N 5/232933 348/239 |
| 2014/0226053 | A1* | 8/2014 | Winer | H04N 23/667 348/333.05 |
| 2019/0082118 | A1* | 3/2019 | Wang | G06T 7/50 |
| 2021/0271379 | A1* | 9/2021 | Chhabra | H04N 5/232933 |
| 2021/0321046 | A1* | 10/2021 | Zhao | H04N 5/2624 |
| 2022/0321795 | A1* | 10/2022 | Jiang | H04N 5/2624 |
| 2022/0377252 | A1* | 11/2022 | Li | H04N 5/2621 |

FOREIGN PATENT DOCUMENTS

| | | | |
|---|---|---|---|
| CN | 106254784 | A | 12/2016 |
| CN | 106657791 | A | 5/2017 |
| CN | 107483837 | A | 12/2017 |
| CN | 107730433 | A | 2/2018 |
| CN | 108024071 | A | 5/2018 |
| CN | 108124109 | A | 6/2018 |
| CN | 109089059 | A | 12/2018 |
| CN | 110062176 | A | 7/2019 |
| CN | 110168630 | A | 8/2019 |
| CN | 110290425 | A * | 9/2019 |
| CN | 110290425 | A | 9/2019 |
| CN | 111464761 | A | 7/2020 |
| CN | 112511741 | A * | 3/2021 |
| EP | 3627824 | A1 | 3/2020 |
| JP | 2005-223513 | A | 8/2005 |
| JP | 2007-013858 | A | 1/2007 |
| JP | 2015-064706 | A | 4/2015 |
| KR | 2005-0067286 | A | 7/2005 |

OTHER PUBLICATIONS

China Patent Application No. 202010266623.9; First Office Action; dated Jun. 3, 2021; 12 pages.
China Patent Application No. 202010266623.9; Reexamination Notice; dated Aug. 2, 2022; 13 pages.
China Patent Application No. 202010266623.9; Rejection Decision; dated Oct. 25, 2021; 13 pages.
European Patent Application No. 21785129.4; Extended Search Report; dated Aug. 3, 2023; 9 pages.
N. Gogoi; "How to Set Virtual Backgrounds in Zoom"; https://www.guidingtech.com/set-virtual-backgrounds-in-zoom/; Guiding Tech; Apr. 2020; accessed Jul. 20, 2023; 18 pages.

* cited by examiner

VIDEO GENERATION BASED ON PREDETERMINED BACKGROUND

CROSS-REFERENCE TO RELATED APPLICATION

The present application is a continuation of International Application No. PCT/CN2021/083405, filed on Mar. 26, 2021, which claims priority to Chinese Patent Application No. 202010266623.9, filed with China National Intellectual Property Administration on Apr. 7, 2020, which is incorporated herein by reference in its entirety.

TECHNICAL FIELD

The present disclosure relates to the field of video processing technologies, and more particularly, to a video processing method and apparatus, an electronic device, and a non-transitory computer readable storage medium.

BACKGROUND

The traditional green screen technology refers to the use of solid-color (preferably green) fabric as the background of actors while filming, such that images of the actors can be cut out and placed on other backgrounds during post-production for synthesis. Later, professional editing software is not limited to be used by film and television practitioners. Video editing enthusiasts can also use professional software such as Adobe Premiere to cut out characters with tools such as pen or eyedropper, and superimpose them on other backgrounds. However, there are two problems with this type of green screen technology, which significantly raise the threshold for users to shoot videos in daily lives:

First, it requires a green screen behind the characters, or the background and the characters have a clear color contrast, and cannot easily handle scenes with rich and mixed colors behind the characters.

Second, it requires the editor to have certain software knowledge, and to perform post-editing after the video is shot, which is relatively complicated and difficult to master.

SUMMARY

The present disclosure is provided to introduce concepts in a simplified form that will be described in detail in the detailed description below. The present disclosure is not intended to identify key features or essential features of the claimed technical solutions, nor is it intended to be used to limit the scope of the claimed technical solutions.

The present disclosure provides a video processing method and apparatus, an electronic device, and a non-transitory computer readable storage medium, capable of solving the problem of high usage threshold for users when shooting videos in daily lives. The technical solutions are as follows.

In a first aspect, a video processing method is provided. The method includes: displaying, when a predetermined application program enters a shooting mode, a predetermined shooting interface in a current interface of the application program, the shooting interface having a predetermined initial background; obtaining an image frame of a target object and the initial background; combining the image frame as a foreground with the initial background for displaying in the shooting interface; starting, in response to receiving a first shooting start instruction, generation of video data based on the image frame and the initial background; and stopping, in response to receiving a first shooting stop instruction, generation of video data to obtain first video data as generated.

In a second aspect, a video processing apparatus is provided. The apparatus includes: a display module configured to display, when a predetermined application program enters a shooting mode, a predetermined shooting interface in a current interface of the application program, the shooting interface having a predetermined initial background; an obtaining module configured to obtain an image frame of a target object and the initial background; the display module further configured to combine the image frame as a foreground with the initial background for displaying in the shooting interface; a receiving module configured to receive a first shooting start instruction and a first shooting stop instruction; a generating module configured to start generation of video data based on the image frame and the initial background; and a stopping module configured to stop generation of video data to obtain first video data as generated.

In a third aspect, an electronic device is provided. The electronic device includes: a processor, a memory, and a bus. The bus is configured to connect the processor and the memory. The memory has operation instructions stored thereon. The processor is configured to invoke the operation instructions, which causes the processor to perform the operations corresponding to the video processing method in the first aspect of the present disclosure.

In a fourth aspect, a non-transitory computer-readable storage medium is provided. The non-transitory computer-readable storage medium having a computer program stored thereon. The program, when executed by a processor, implements the video processing method in the first aspect of the present disclosure.

The advantageous effects brought by the technical solutions according to the present disclosure are as follows.

When the predetermined application program enters the shooting mode, the predetermined shooting interface is displayed in the current interface of the application program. The shooting interface has a predetermined initial background. Then the image frame of the target object and the initial background are obtained, and the image frame, as the foreground, and the initial background are combined and displayed in the shooting interface. In response to receiving the first shooting start instruction, generation of video data based on the image frame and the initial background is started. In response to receiving the first shooting stop instruction, generation of video data is stopped, and the first video data as generated is obtained. In this way, in the process of daily video shooting, regardless of whether the user's background is a solid color or close to a solid color, the target object can be combined with the background desired by the user, which reduces a large amount of user operations and improves the user experience. Moreover, the user can enter the shooting mode provided by the present disclosure with a simple operation, the interaction path is quick and convenient, and the user does not need to go through many times of switching between interfaces or functions, which further improves the user experience.

BRIEF DESCRIPTION OF DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that components and elements are not necessarily drawn to scale.

DESCRIPTION OF EMBODIMENTS

Figure 1:
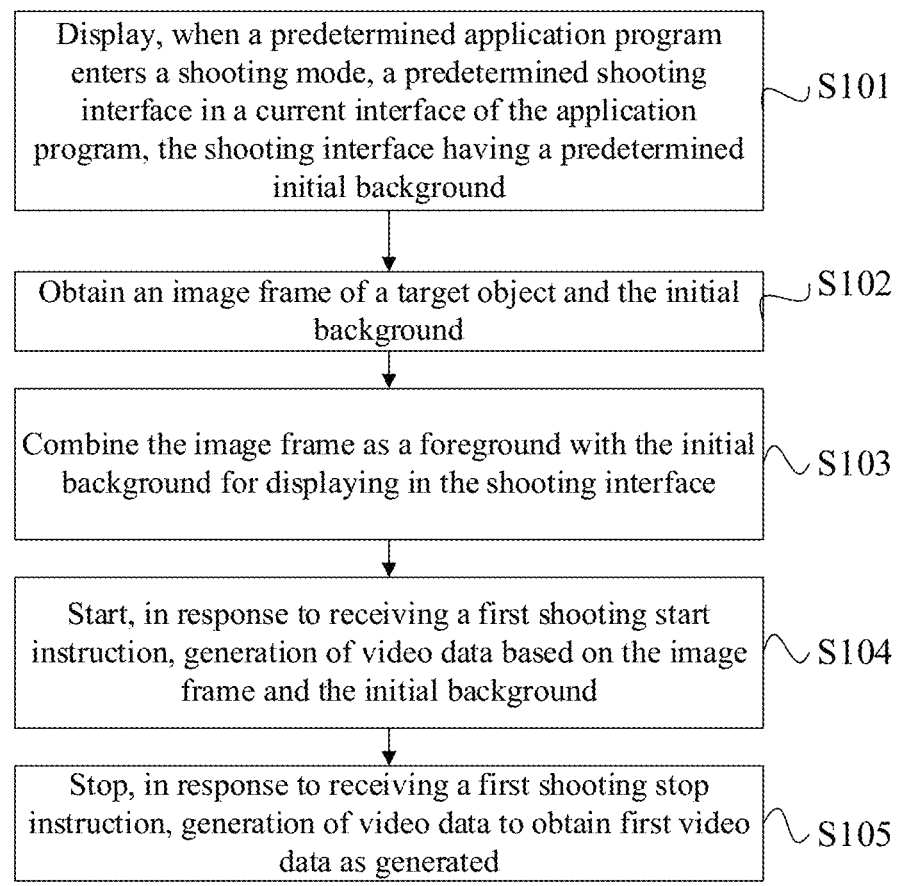
FIG. 1 is a schematic flowchart illustrating a video processing method according to an embodiment of the present disclosure.

Embodiments of the present disclosure will be described in further detail below with reference to the accompanying figures. While some embodiments of the present disclosure are shown in the figures, it should be understood that the present disclosure may be embodied in various forms and should not be construed as being limited to the embodiments set forth herein. Rather, these embodiments are provided for the purpose of more thorough and complete understanding of the present disclosure. It should be understood that the figures and embodiments of the present disclosure are only for the purpose of illustration, and are not intended to limit the scope of the present disclosure.

It should be understood that various steps described in the method embodiments of the present disclosure may be performed in different orders and/or in parallel. Furthermore, method embodiments may include one or more additional steps and/or may omit one or more illustrated steps. The scope of the present disclosure is not limited in this regard.

As used herein, the term "including" and variations thereof are open-ended inclusions, i.e., "including but not limited to". The term "based on" means "based at least in part on." The term "an embodiment" means "at least one embodiment". The term "another embodiment" means "at least one further embodiment". The term "some embodiments" means "at least some embodiments". Relevant definitions of other terms will be given in the description below.

It should be noted that concepts such as "first" and "second" as used in the present disclosure are only used to distinguish different devices, modules or units from each other, and are not intended to limit these devices, modules or units to be necessarily different devices, modules or units and are not intended to limit any order or interdependence between the functions performed by these devices, modules or units.

It should be noted that the modifications by "one" and "a plurality" as used in the present disclosure are illustrative rather than limiting, and it can be appreciated by those skilled in the art that they should be understood as "one or more", unless explicitly indicated otherwise in the context.

The names of messages or information exchanged between devices in the embodiments of the present disclosure are only for the purpose of illustration, and are not intended to limit the scope of the messages or information.

In order to make the objects, technical solutions and advantages of the present disclosure more apparent, the embodiments of the present disclosure will be further described in detail below with reference to the accompanying figures.

The video processing method and apparatus, electronic device and non-transitory computer-readable storage medium according to the present disclosure are intended to solve the above technical problems in the related art.

The technical solutions of the present disclosure, and how the technical solutions of the present disclosure can solve the above technical problems, will be described in detail below with specific embodiments. The following specific embodiments may be combined with each other, and the same or similar concepts or processes may be omitted in some embodiments. The embodiments of the present disclosure will be described below with reference to the accompanying figures.

In an embodiment, a video processing method is provided, as shown in FIG. 1. The method includes the following steps.

At step S101, when a predetermined application program enters a shooting mode, a predetermined shooting interface is displayed in a current interface of the application program. The shooting interface has a predetermined initial background.

Specifically, the application program may have a predetermined shooting mode. When the application program is in the shooting mode, the application program may invoke an image capturing device, an audio capturing device, etc., on a terminal to capture data such as images and audio. The predetermined shooting interface may be provided with an initial background, which may be a video background or an image background. When the application program displays the shooting interface, the initial background will be displayed on the shooting interface.

At step S102, an image frame of a target object and the initial background are obtained.

Generally speaking, when the application program loads the shooting interface, the application program can obtain the initial background from a predetermined video background resource library and display the initial background in the shooting interface. At the same time, the image frame of the target object, for example, an image frame of a human object, can be obtained.

At step S103, the image frame as a foreground is combined with the initial background for displaying in the shooting interface.

After obtaining the image frame of the target object and the initial background, the image frame of the target object can be used as the foreground, and the initial background can be used as the background, and the image frame and the initial background can be displayed in the shooting interface at the same time.

At step S104, in response to receiving a first shooting start instruction, generation of video data is started based on the image frame and the initial background.

At step S105, in response to receiving a first shooting stop instruction, generation of video data is stopped to obtain first video data as generated.

Specifically, when the user triggers the shooting start instruction, the application program can start generation of video data based on the image frame and the initial background, and then store the generated video data. When the user triggers the shooting stop instruction, the application program can stop generation of video data to obtain a segment of video data.

In the embodiment of the present disclosure, when the predetermined application program enters the shooting mode, the predetermined shooting interface is displayed in the current interface of the application program. The shooting interface has a predetermined initial background. Then the image frame of the target object and the initial background are obtained, and the image frame, as the foreground, and the initial background are combined and displayed in the shooting interface. In response to receiving the first shooting start instruction, generation of video data based on the image frame and the initial background is started. In response to receiving the first shooting stop instruction, generation of video data is stopped, and the first video data as generated is obtained. In this way, in the process of daily video shooting, regardless of whether the user's background is a solid color or close to a solid color, the target object can be combined with the background desired by the user, which reduces a large amount of user operations and improves the user experience. Moreover, the user can enter the shooting mode provided by the present disclosure with a simple operation, the interaction path is quick and convenient, and the user does not need to go through many times of switching between interfaces or functions, which further improves the user experience.

Figure 2:
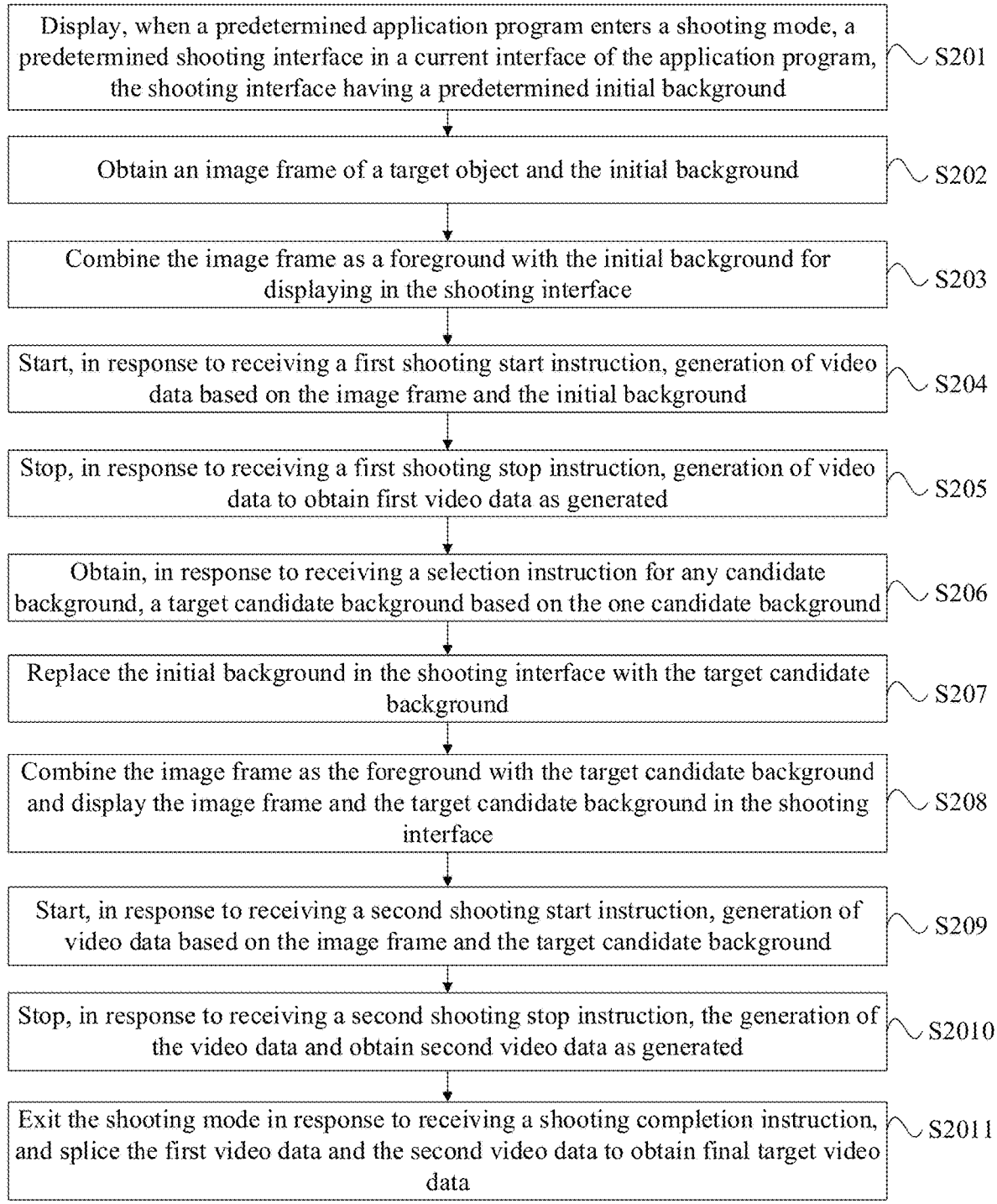
FIG. 2 is a schematic flowchart illustrating a video processing method according to another embodiment of the present disclosure.

In an embodiment, a video processing method is provided, as shown in FIG. 2. The method includes the following steps.

At step S201, when a predetermined application program enters a shooting mode, a predetermined shooting interface is displayed in a current interface of the application program. The shooting interface has a predetermined initial background.

Specifically, the application program can be installed in a terminal, and the terminal can have the following characteristics:

(1) For the hardware system, the device may have a central processor, a memory, an input component and an output component. That is, the device is typically a microcomputer device with a communication function. In addition, it can also have a variety of input means, such as a keyboard, a mouse, a touch screen, a microphone and a camera, etc., and can adjust the input as needed. Also, the device typically has a variety of output means, such as a receiver, a display screen, etc., which can also be adjusted as needed.

(2) For the software system, the device must have an operating system, such as Windows Mobile, Symbian, Palm, Android, iOS, etc. Further, these operating systems are becoming more and more open, and personalized application programs developed based on these open operating system platforms emerge one after another, such as address book, calendar, notepad, calculator and various games, etc., which greatly fulfill personalized needs of users.

(3) For communication capabilities, the device has flexible access modes and high-bandwidth communication performance, and can automatically adjust the selected communication mode according to the selected service and the environment, so as to facilitate operations by users. The device can support Global System for Mobile Communication (GSM), Wideband Code Division Multiple Access (WCDMA), Code Division Multiple Access 2000 (CDMA 2000), Time Division-Synchronous Code Division Multiple Access (TDSCDMA), Wireless-Fidelity (Wi-Fi) and Worldwide Interoperability for Microwave Access (WiMAX), etc., so as to adapt to a variety of standardized networks, and to support not only voice services, but also a variety of wireless data services.

(4) For function usage, the device pays more attention to humanization, personalization and multi-functionality. With the development of computer technology, the device has changed from the "device-centered" model to the "people-centered" model, integrating embedded computing, control technology, artificial intelligence technology and biometric authentication technology, which fully reflects the purpose of being people-oriented. Thanks to the development of software technology, the device can adjust the settings according to individual needs, making it more personalized. At the same time, the device itself integrates a lot of software and hardware, and its functions are becoming more and more powerful.

Further, the application program may have a predetermined shooting mode. When the application program is in the shooting mode, the application program may invoke an image capturing device, an audio capturing device, etc., on the terminal to capture data such as images and audio.

Figure 3:
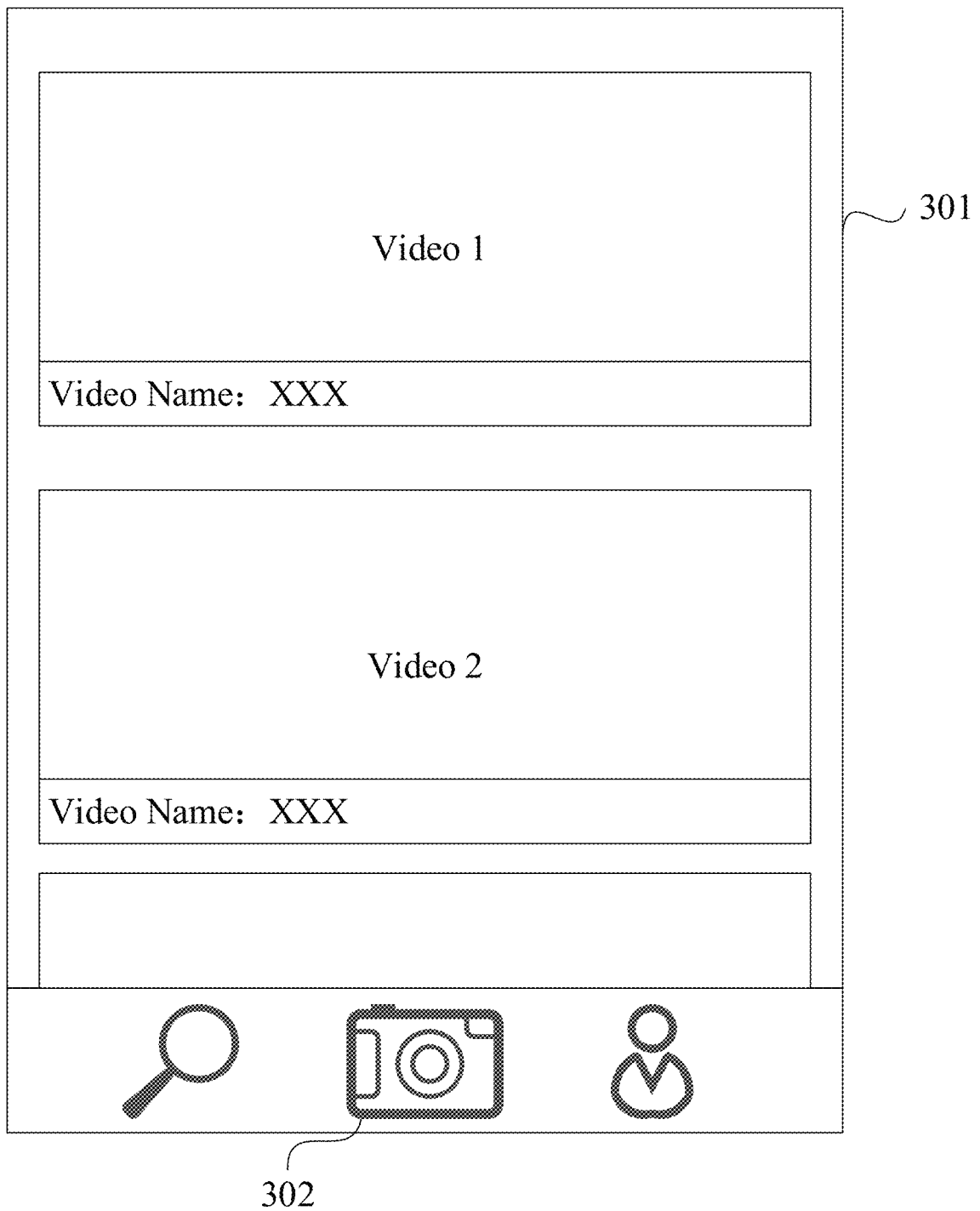
FIG. 3 is a schematic diagram showing a default interface when an application program is loaded according to the present disclosure.

Specifically, after the user starts the application program in the terminal, he/she can cause the application program to enter the shooting mode by triggering a specified instruction. For example, as shown in FIG. 3, a button 302 for entering the shooting mode can be provided in an initial interface 301 of the application program. When the user clicks on this button, the instruction to enter the shooting mode is triggered, such that the application program will enter the shooting mode, and then display the predetermined shooting interface. The predetermined shooting interface may be provided with an initial background, which may be a video background or an image background. When the application program displays the shooting interface, the initial background will be displayed on the shooting interface.

Figure 4:
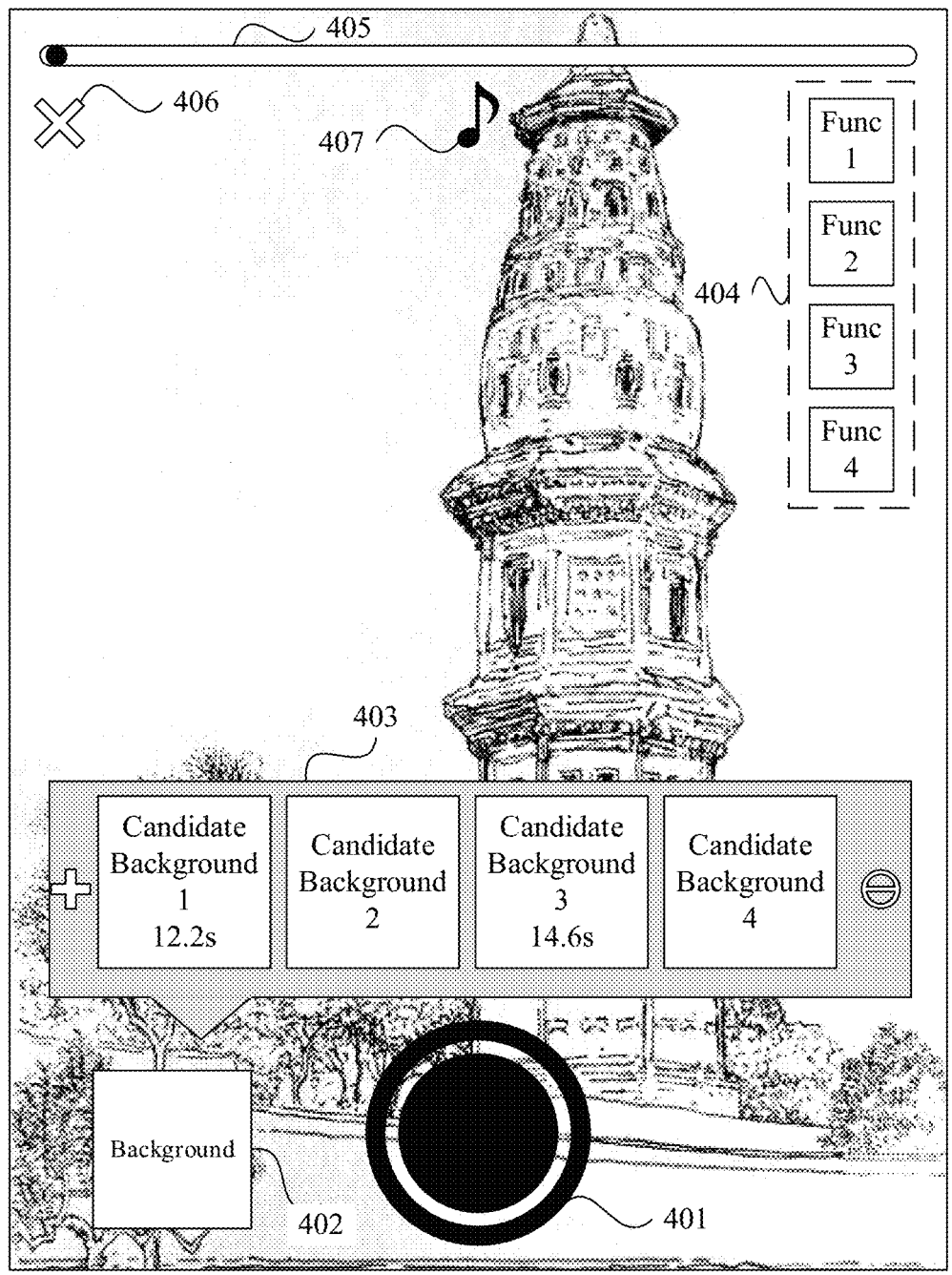
FIG. 4 is a schematic diagram showing a default interface of a shooting interface of an application program according to the present disclosure.
Figure 5:
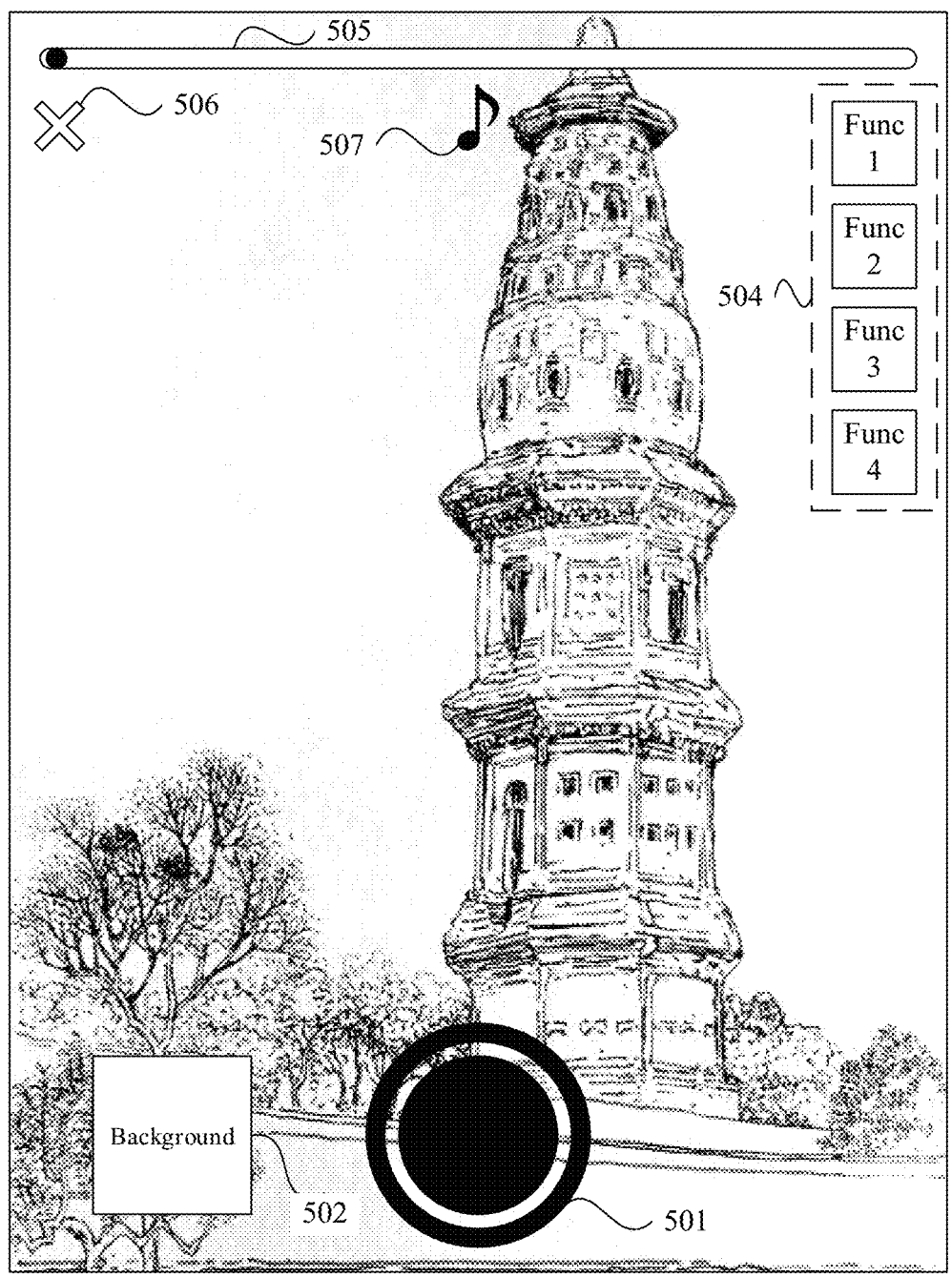
FIG. 5 is a schematic diagram showing an interface in which a shooting interface of an application program does not display a background preview window according to the present disclosure.
Figure 6:
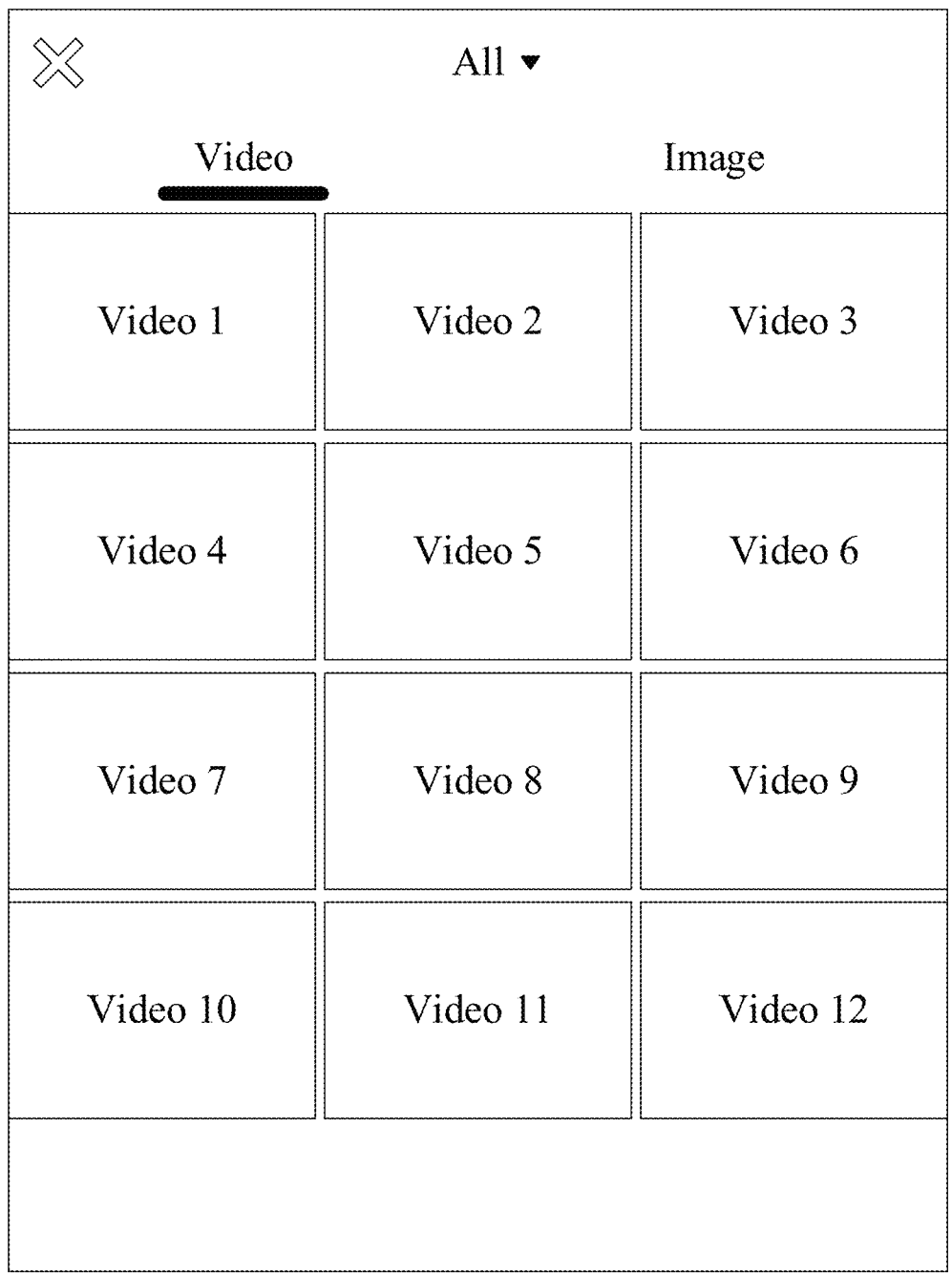
FIG. 6 is a schematic diagram showing an interface in which an application program displays a local background according to the present disclosure.

As shown in FIG. 4, the predetermined shooting interface may include a shooting button 401, a button 402 for displaying/closing a background preview window, a background preview window 403, a functional area 404, a shooting progress bar 405, and a button 406 for exiting the shooting interface, and an audio management button 407. In practical applications, if the preview window has been displayed in the shooting interface (as shown in FIG. 4), then when the user clicks on the button 402, the background preview window will be closed, as shown in FIG. 5. If no preview window is displayed in the shooting interface, then when the user clicks on the button 402, the background preview window will be displayed in the shooting interface (as shown in FIG. 4). Here, the functional area may include a plurality of functional buttons for assisting shooting. The background preview window is used to display candidate backgrounds for replacing the initial background, and the candidate backgrounds include image backgrounds and video backgrounds. When displaying a video background, a time length of the video background can be displayed. The "+" in the background preview window can be an interface to a local storage. When the user clicks "+", the locally stored video backgrounds and image backgrounds can be displayed, as shown in FIG. 6.

Further, in practical applications, in the initial interface of the application program, the button 302 can be clicked on to enter the shooting interface, and icons of other modes can be provided in the shooting interface. For example, icons of other modes such as "photography mode" and "normal shooting mode" (not shown) can be provided at a bottom of the shooting interface. When the user clicks on different icons, the corresponding mode can be entered. In practical applications, different configurations may be provided according to actual requirements, and the embodiment of the present disclosure is not limited to any of these examples.

Here, the "photography mode" can be used for shooting photos, and the "normal shooting mode" can be used for shooting ordinary videos without background and special effects.

Further, in the initial interface of the application program, by clicking on the button 302, the shooting mode in the present disclosure can be performed by default, or the "photography mode" or "normal shooting mode" can be entered by default, and then the user may switch to the shooting mode in the present disclosure. In practical applications, different configurations may be provided according to actual requirements, and the embodiment of the present disclosure is not limited to any of these examples.

At step S202, an image frame of a target object and the initial background are obtained.

Generally speaking, when the application program loads the shooting interface, the application program can obtain the initial background from a predetermined video background resource library and display the initial background on the shooting interface. At the same time, the image frame of the target object, for example, an image frame of a human object, can be obtained.

According to an embodiment of the present disclosure, the operation of obtaining the image frame of the target object may include:

obtaining an image frame using a predetermined image capturing device; and extracting, in response to detecting the target object in the image frame, the target object from the image frame to obtain the image frame of the target object.

Figure 7A:
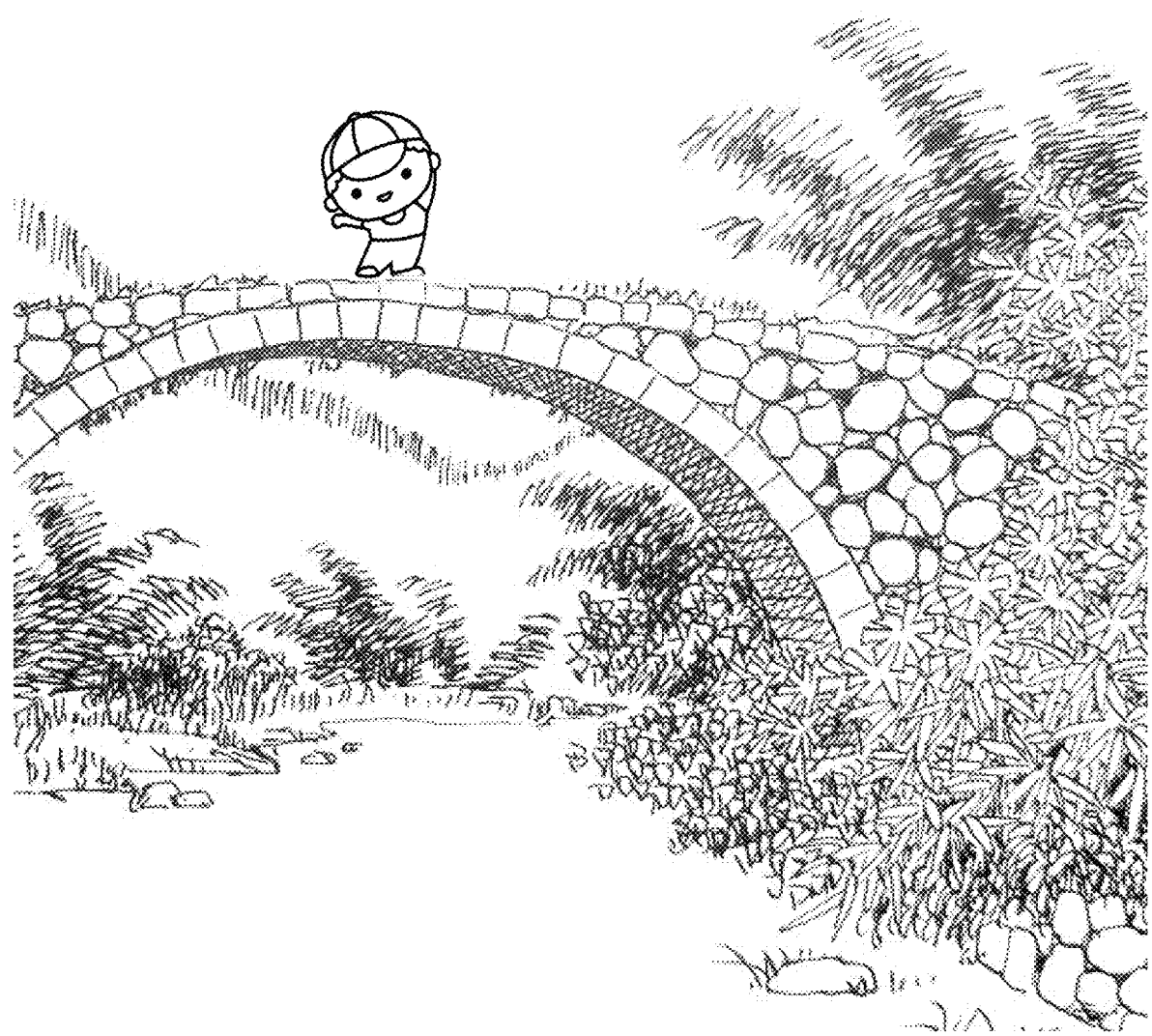
FIG. 7A shows an image frame captured by an application program using a terminal according to the present disclosure.
Figure 7B:
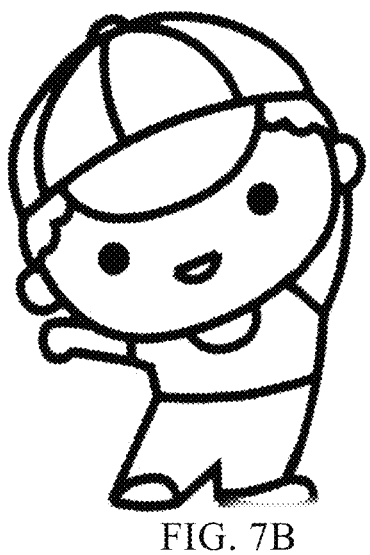
FIG. 7B shows an image frame of a target object extracted from an image frame by an application program according to the present disclosure.

Specifically, when the application program loads the shooting interface, the application program may also invoke the image capturing device in the terminal, and obtain the image frame using the image capturing device, and then detect whether the image frame contains the target object, e.g., the human object, using a predetermined target object detection model. If the target object is contained, the target object is extracted from the image frame. For example, the image frame obtained by the image capturing device may be shown in FIG. 7A, and it is detected that the image frame contains a human object. Thus the human object is extracted from the image frame to obtain the image frame of the human object as shown in FIG. 7B. Here, when extracting the target object, the background of the target object may be any background, which is not necessarily a solid-color background or a background close to a solid color.

It is to be noted that the process of extracting the target object may or may not be presented to the user. That is, the user can directly view the image frame of the target object, or the image frame can be displayed first and then the target object is extracted and the image frame of the target object is displayed. In practical applications, different configurations may be provided according to actual requirements, and the embodiment of the present disclosure is not limited to any of these examples.

Further, in addition to the above method for extracting the target object, other extraction methods are also applicable to the embodiment of the present disclosure. In practical applications, different configurations may be provided according to actual requirements, and the embodiment of the present disclosure is not limited to any of these examples.

At step S203, the image frame as a foreground is combined with the initial background for displaying in the shooting interface.

Figure 8:
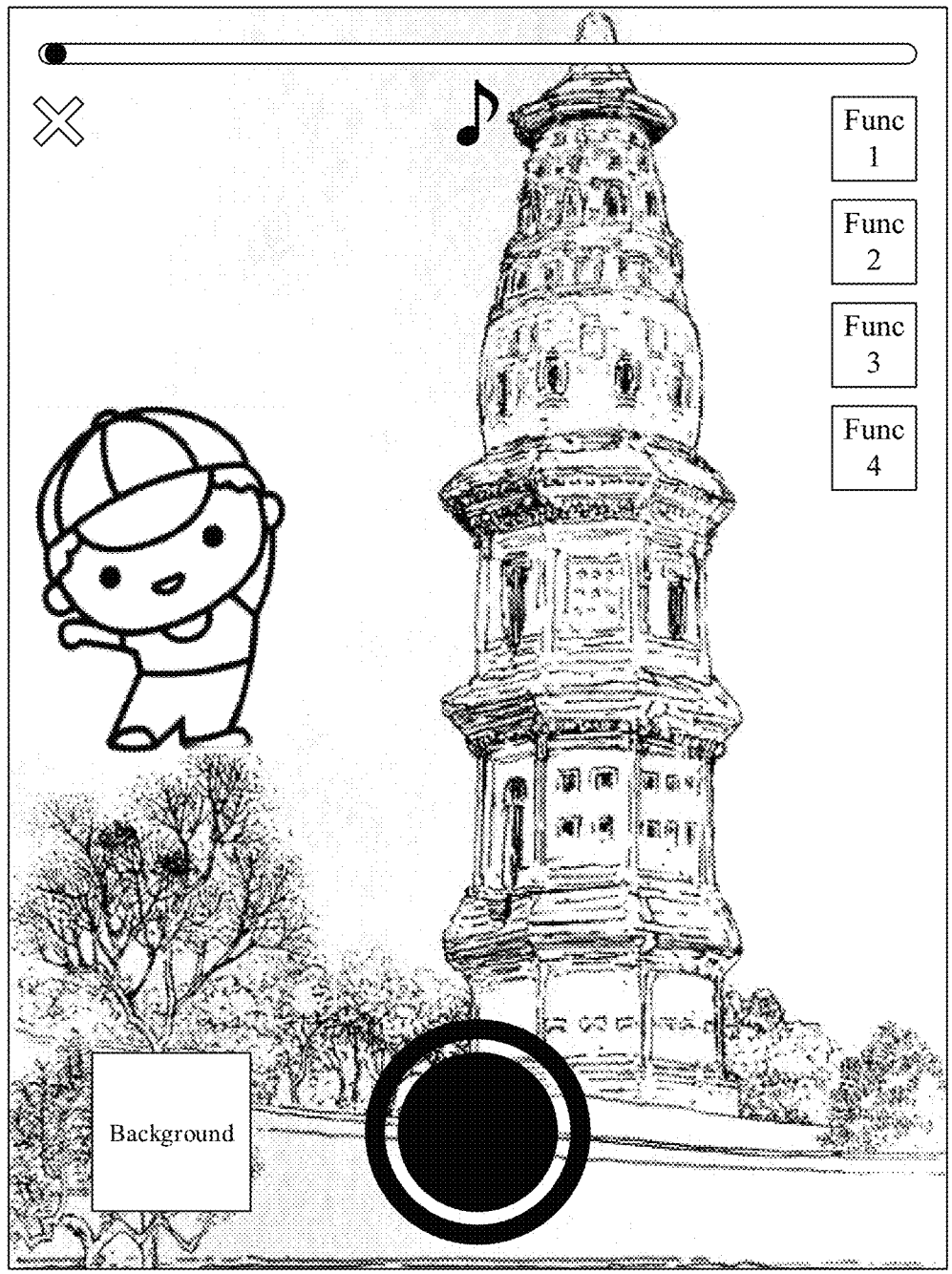
FIG. 8 is a schematic diagram showing an interface in which an application program displays an initial background and an image frame of a target object in a shooting interface according to the present disclosure.

After obtaining the image frame of the target object and the initial background, the image frame of the target object can be used as the foreground, and the initial background can be used as the background, and the image frame and the initial background can be displayed in the shooting interface at the same time, as shown in FIG. 8.

At step S204, in response to receiving a first shooting start instruction, generation of video data is started based on the image frame and the initial background At step S205, in response to receiving a first shooting stop instruction, the generation of the video data is stopped and first video data as generated is obtained.

Figure 9:
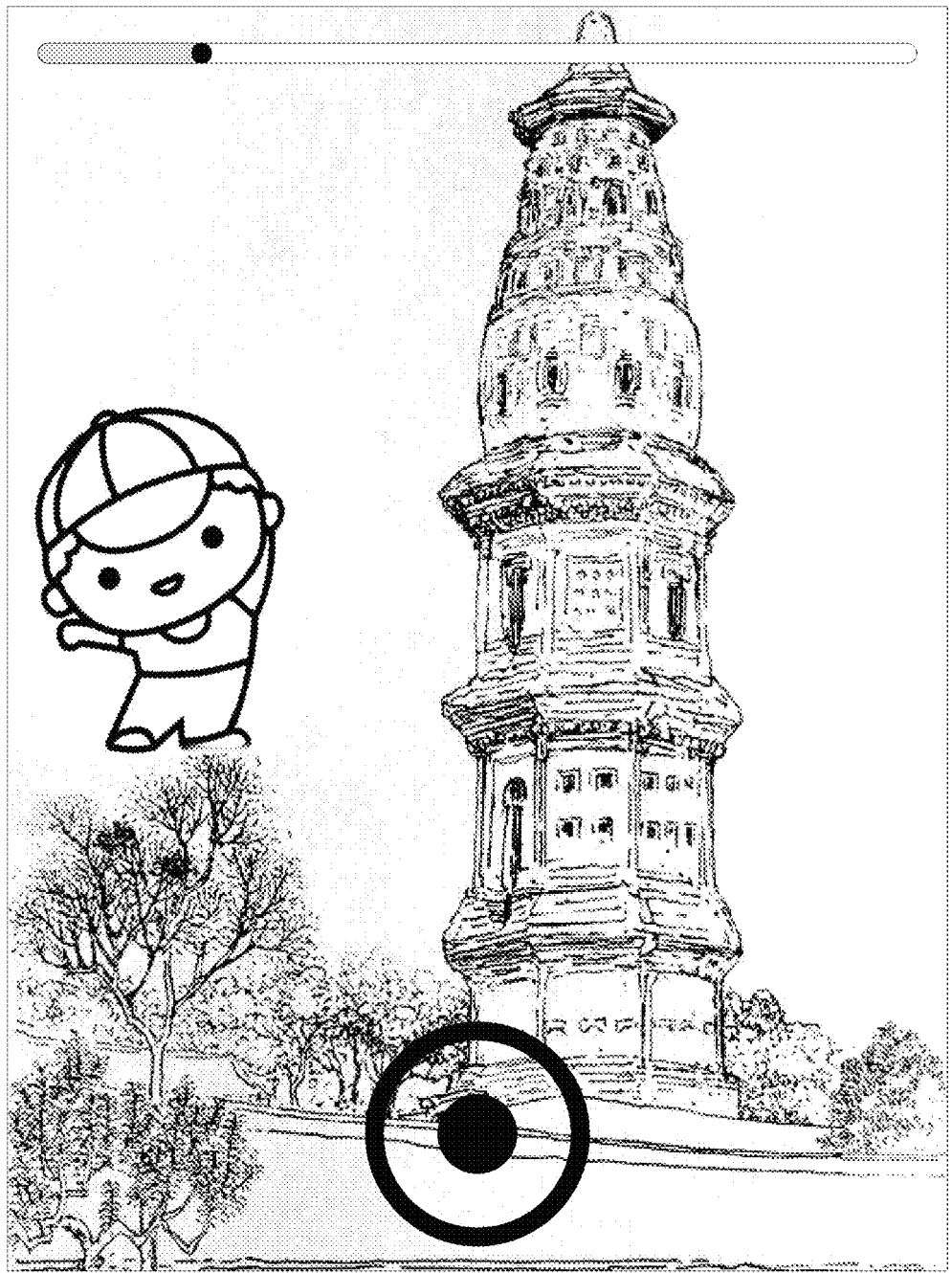
FIG. 9 is a schematic diagram showing an interface when an application program generates video data according to the present disclosure.

Specifically, after the user triggers the shooting start instruction, the application program can start generation of video data based on the image frame and the initial background. The interface when generating the video can be shown in FIG. 9. Then the generated video data is stored. When the user triggers the shooting stop instruction, the application program can stop generation of video data, obtaining a segment of video data.

Further, the user triggering the shooting start instruction may be the user clicking on a shooting button, and the user triggering the shooting stop instruction may be the user clicking on the shooting button again. Alternatively, the user may trigger the shooting start instruction and generation of video data by clicking on and continuously pressing the shooting button. The user may release the shooting button to trigger the shooting stop instruction. Of course, it is also applicable to the embodiment of the present disclosure that the user triggers the shooting start instruction and the shooting stop instruction using other control methods, such as voice control, gesture control, etc. In practical applications, different configurations may be provided according to actual requirements, and the embodiment of the present disclosure is not limited to any of these examples.

At step S206, in response to receiving a selection instruction for one candidate background, a target candidate background is obtained based on the one candidate background.

When the user clicks on any candidate background in the background preview window, the application program can determine the target candidate background based on the candidate background.

According to an embodiment of the present disclosure, the one candidate background may be a video background, and the operation of obtaining the target candidate background based on the one candidate background may include:

displaying a predetermined video editing interface, and displaying the video background in the video editing interface;

receiving an editing instruction for the video background, and in response to the editing instruction, editing the video background to obtain a preview of the edited video background; and obtaining, in response to receiving a confirmation instruction for the preview of the edited video background, the edited video background as the target candidate background.

Figure 10:
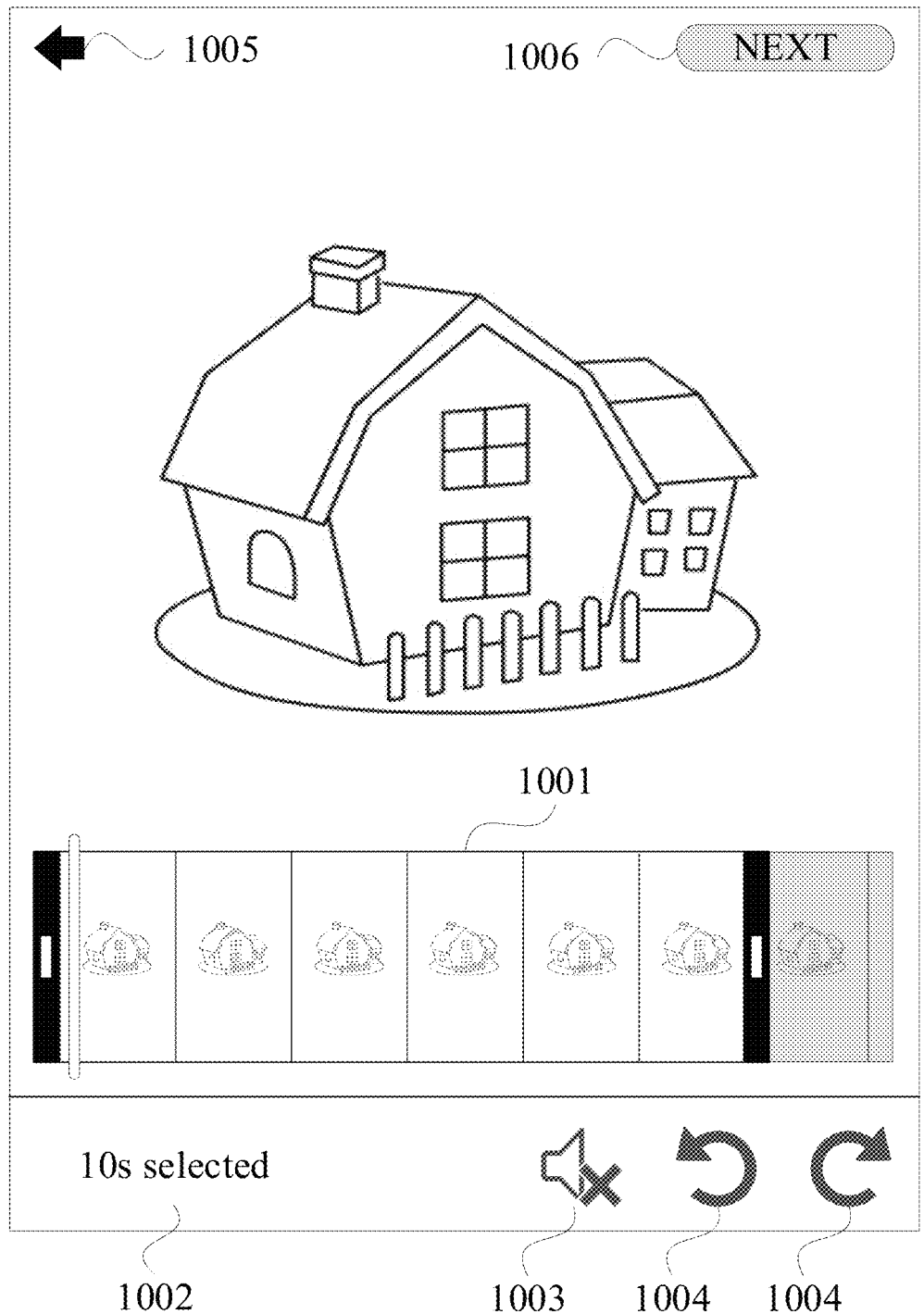
FIG. 10 is a schematic diagram showing an interface in which an application program edits a video background according to the present disclosure.

Specifically, if the candidate background selected by the user is a video background, the predetermined video editing interface can be displayed in the application program, and the video background can be displayed in the video editing interface. As shown in FIG. 10, the video editing interface includes a video frame selection box 1001, a time length of the selected video frames 1002, a mute button 1003, a rotate button 1004, a back button 1005, and a confirm button 1006.

In the editing interface, the user can select a video in the video background by dragging the video frame selection box. The video background preview of this video is displayed in the video frame selection box, and the time length of the selected video frame is the time length of the video, and then the user clicks on the confirm button to use this video as the target candidate background. Moreover, the user may also click on the mute button and the rotate button to make corresponding adjustments.

If the selected candidate background is an image background, the candidate background can be directly used as the target candidate background, or the image background can be edited first, e.g., by cropping, toning, etc., and then the edited image background can be used as the target candidate background.

At step S207, the initial background in the shooting interface is replaced with the target candidate background.

At step S208, the image frame as the foreground is combined with the target candidate background for displaying in the shooting interface.

Figure 11:
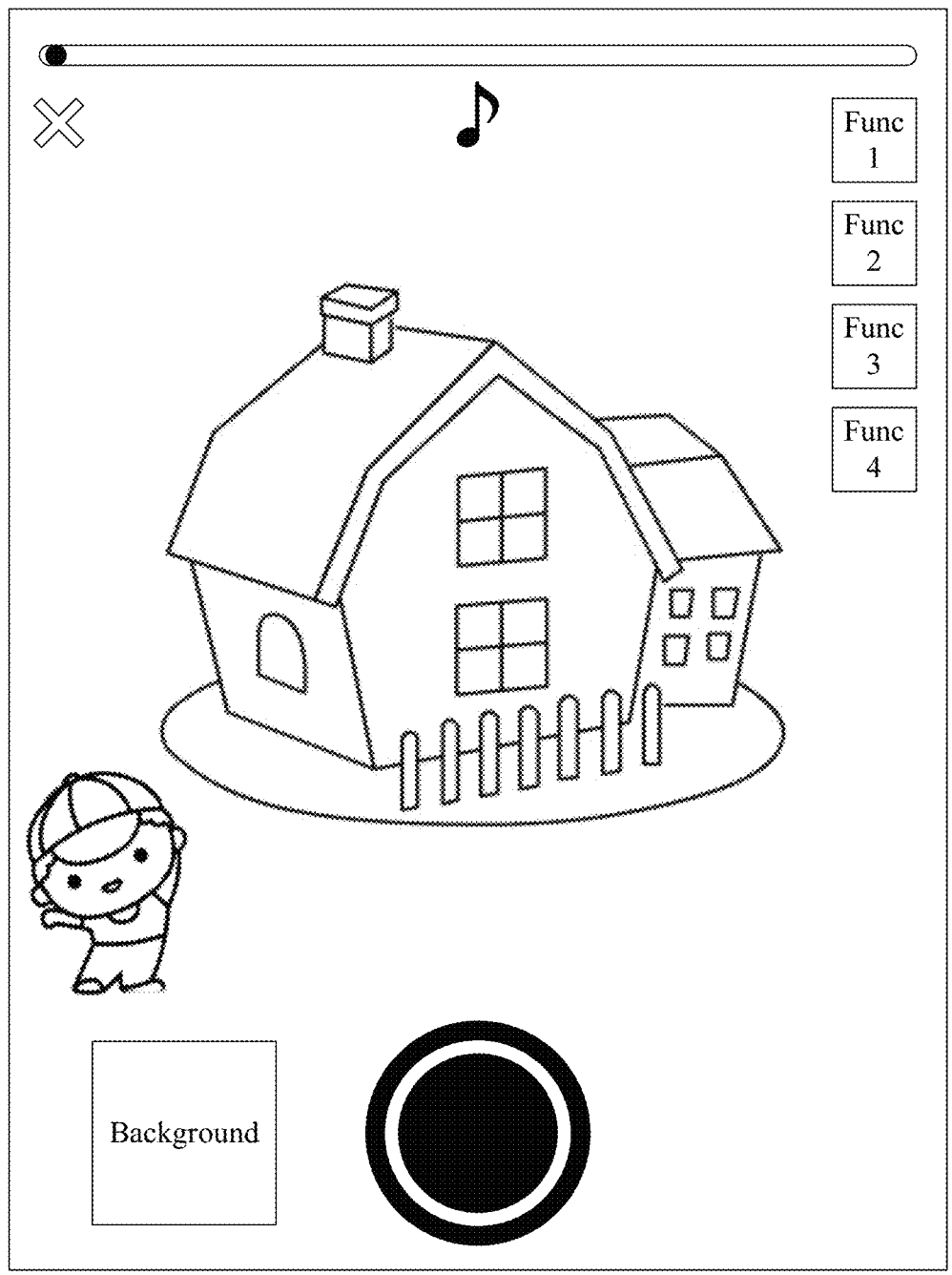
FIG. 11 is a schematic diagram showing an interface in which an application program displays an image frame of a candidate background and a target object in a shooting interface according to the present disclosure.

When the user clicks on the confirm button in the editing interface, the target candidate background can be used to replace the initial background in the shooting interface. The target candidate background is used as the background, and the image frame is used as the foreground, and the target candidate background and image frame are displayed in the shooting interface. For example, by replacing the background of the shooting interface shown in FIG. 8, the shooting interface shown in FIG. 11 can be obtained.

At step S209, in response to receiving a second shooting start instruction, generation of video data is started based on the image frame and the target candidate background.

At step S2010, in response to receiving a second shooting stop instruction, generation of video data is stopped to obtain second video data as generated.

At step S2011, the shooting mode is exited in response to receiving a shooting completion instruction, and the first video data and the second video data are spliced to obtain final target video data.

Generally speaking, the user will continue shooting video after replacing the background. For the principle of shooting video, reference can be made to steps S204 to S205, and details thereof will be omitted here.

Figure 12:
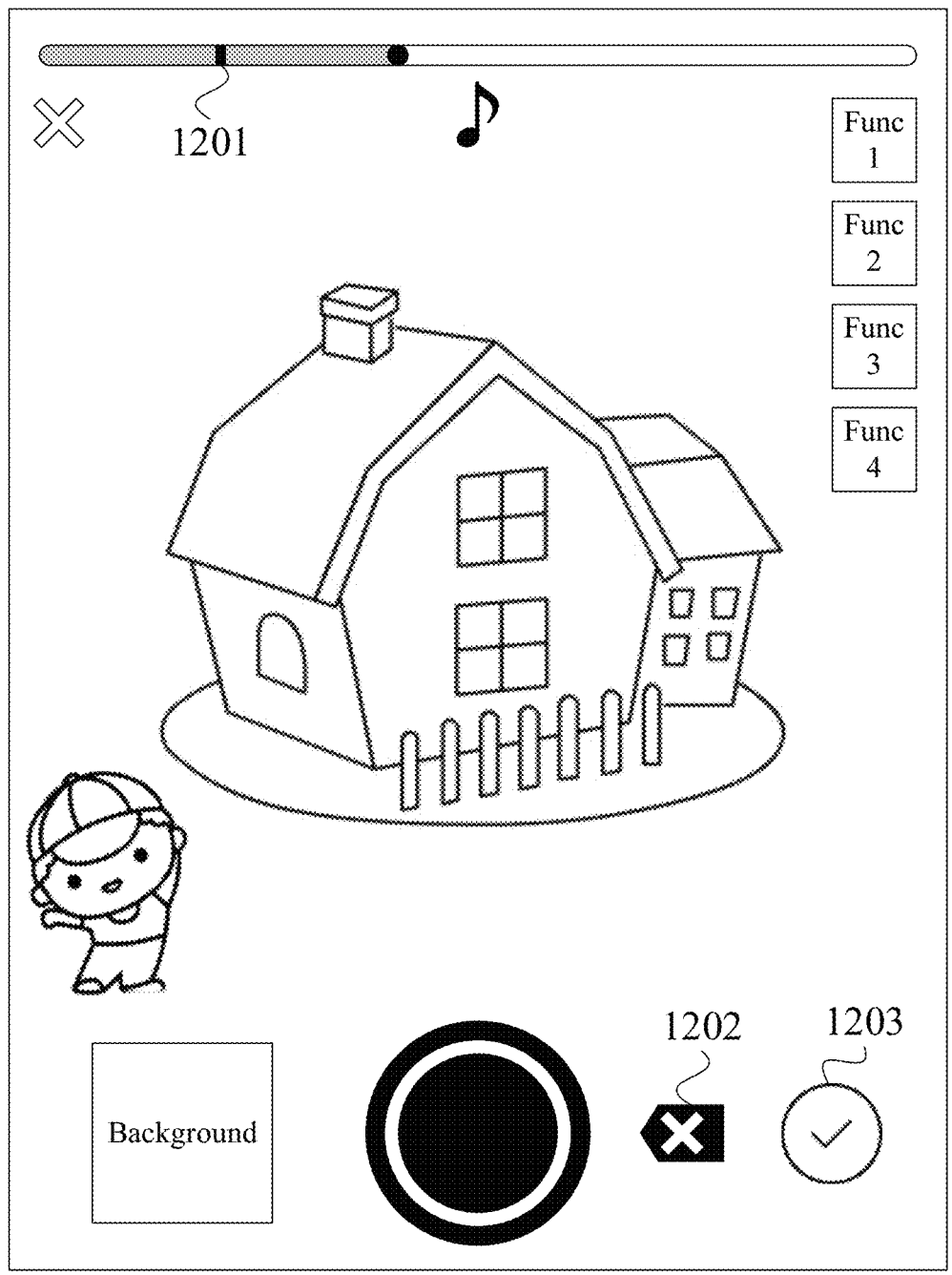
FIG. 12 is a schematic diagram showing a shooting interface after an application program has generated two video data segments.

Further, as shown in FIG. 12, the shooting progress bar can show the time length of the video that has been shot. If a number of video segments are shot, markers 1201 can be provided between video segments in the progress, and at the same time, the shooting interface can also display a re-shoot button 1202 and a complete shooting button 1203. When the user clicks on the re-shoot button, the shooting can be restarted in the shooting interface as shown in FIG. 8. When the user clicks on the complete shooting button, the shooting mode can be exited, and at least one segment of video data that the user has shot can be spliced to obtain the final target video data.

It should be noted that the two segments of video data in the embodiment of the present disclosure are for illustration only. In practical applications, a user can shoot multiple segments of video data, not only two segments of video data, and the embodiment of the present disclosure is not limited to any of these examples.

In the embodiment of the present disclosure, when the predetermined application program enters the shooting mode, the predetermined shooting interface is displayed in the current interface of the application program. The shooting interface has a predetermined initial background. Then the image frame of the target object and the initial background are obtained, and the image frame, as the foreground, and the initial background are combined and displayed in the shooting interface. In response to receiving the first shooting start instruction, generation of video data based on the image frame and the initial background is started. In response to receiving the first shooting stop instruction, generation of video data is stopped, and the first video data as generated is obtained. In this way, in the process of daily video shooting, regardless of whether the user's background is a solid color or close to a solid color, the target object can be combined with the background desired by the user, which reduces a large amount of user operations and improves the user experience. Moreover, the user can enter the shooting mode provided by the present disclosure with a simple operation, the interaction path is quick and convenient, and the user does not need to go through many times of switching between interfaces or functions, which further improves the user experience.

Moreover, it can not only support image backgrounds and video backgrounds, but also support shooting in segments. When the shooting is completed, a number of segments of videos with different backgrounds can be automatically synthesized into one complete video. In this way, one complete video contains a number of backgrounds, which improves the interestingness of the video without requiring the user to manually synthesize the segments of video, thereby reducing manual operations of the user and further improving the user experience.

Figure 13:
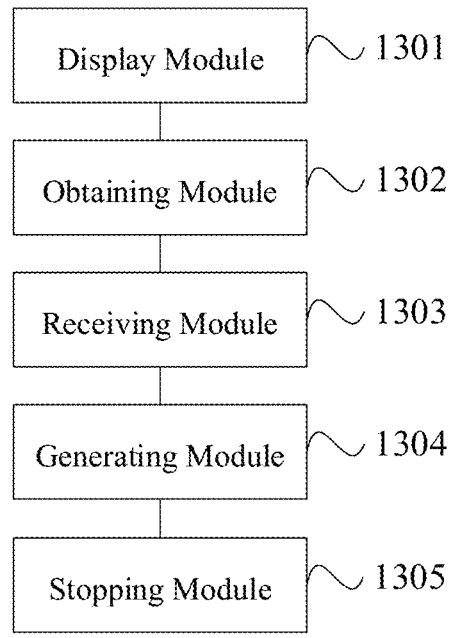
FIG. 13 is a schematic diagram showing a structure of a video processing apparatus according to another embodiment of the present disclosure.

FIG. 13 is a schematic diagram showing a structure of a video processing apparatus according to another embodiment of the present disclosure. As shown in FIG. 13, the apparatus of this embodiment may include a display module 1301, an obtaining module 1302, a receiving module 1303, a generating module 1304, and a stopping module 1305.

The display module 1301 is configured to display, when a predetermined application program enters a shooting mode, a predetermined shooting interface on a current interface of the application program. The shooting interface has a predetermined initial background.

The obtaining module 1302 is configured to obtain an image frame of a target object and the initial background.

The display module 1301 is further configured to combine the image frame as a foreground with the initial background for displaying in the shooting interface.

The receiving module 1303 is configured to receive a first shooting start instruction and a first shooting stop instruction.

The generating module 1304 is configured to start generation of video data based on the image frame and the initial background.

The stopping module 1305 is configured to stop generation of video data to obtain first video data as generated.

According to an embodiment of the present disclosure, a predetermined background preview window is further displayed in the shooting interface, and the background preview window is used to display candidate backgrounds for replacing the initial background. The candidate backgrounds include image backgrounds and video backgrounds.

According to an embodiment of the present disclosure, the receiving module 1303 is further configured to receive a selection instruction for one candidate background.

According to an embodiment of the present disclosure, the display module 1301 is further configured to combine the image frame as the foreground with the target candidate background for displaying in the shooting interface.

According to an embodiment of the present disclosure, the apparatus further includes:
  a processing module configured to obtain a target candidate background based on the one candidate background; and
  a replacing module configured to replace the initial background in the shooting interface with the target candidate background.

According to an embodiment of the present disclosure, the processing module may specifically include:
  a display sub-module configured to display a predetermined video editing interface, and display the video background in the video editing interface;
  an editing sub-module configured to receive an editing instruction for the video background, and in response to the editing instruction, edit the video background to obtain a preview of the edited video background; and
  a determining sub-module configured to obtain, in response to receiving a confirmation instruction for the preview of the edited video background, the edited video background as the target candidate background.

According to an embodiment of the present disclosure, the receiving module is further configured to receive a second shooting start instruction.

The generating module is further configured to start generation of video data based on the image frame and the target candidate background.

The receiving module is further configured to receive a second shooting stop instruction.

The stopping module is further configured to stop generation of video data to obtain second video data as generated.

According to an embodiment of the present disclosure, the obtaining module may include:

an obtaining sub-module configured to obtain an image frame using a predetermined image capturing device; and
  an extracting sub-module configured to extract, in response to detecting the target object in the image frame, the target object from the image frame to obtain the image frame of the target object.

According to an embodiment of the present disclosure, the receiving module is further configured to receive a shooting completion instruction.

According to an embodiment of the present disclosure, the apparatus may further include:
  a splicing module configured to exit the shooting mode and splice the first video data and the second video data to obtain final target video data.

The video processing apparatus in this embodiment can perform the video processing methods shown in the first embodiment and the second embodiment of the present disclosure, and the implementation principles thereof are similar, and details thereof will be omitted here.

In the embodiment of the present disclosure, when the predetermined application program enters the shooting mode, the predetermined shooting interface is displayed in the current interface of the application program. The shooting interface has a predetermined initial background. Then the image frame of the target object and the initial background are obtained, and the image frame, as the foreground, and the initial background are combined and displayed in the shooting interface. In response to receiving the first shooting start instruction, generation of video data based on the image frame and the initial background is started. In response to receiving the first shooting stop instruction, generation of video data is stopped, and the first video data as generated is obtained. In this way, in the process of daily video shooting, regardless of whether the user's background is a solid color or close to a solid color, the target object can be combined with the background desired by the user, which reduces a large amount of user operations and improves the user experience. Moreover, the user can enter the shooting mode provided by the present disclosure with a simple operation, the interaction path is quick and convenient, and the user does not need to go through many times of switching between interfaces or functions, which further improves the user experience.

Moreover, it can not only support image backgrounds and video backgrounds, but also support shooting in segments. When the shooting is completed, a number of segments of videos with different backgrounds can be automatically synthesized into one complete video. In this way, one complete video contains a number of backgrounds, which improves the interestingness of the video without requiring the user to manually synthesize the segments of video, thereby reducing manual operations of the user and further improving the user experience.

Figure 14:
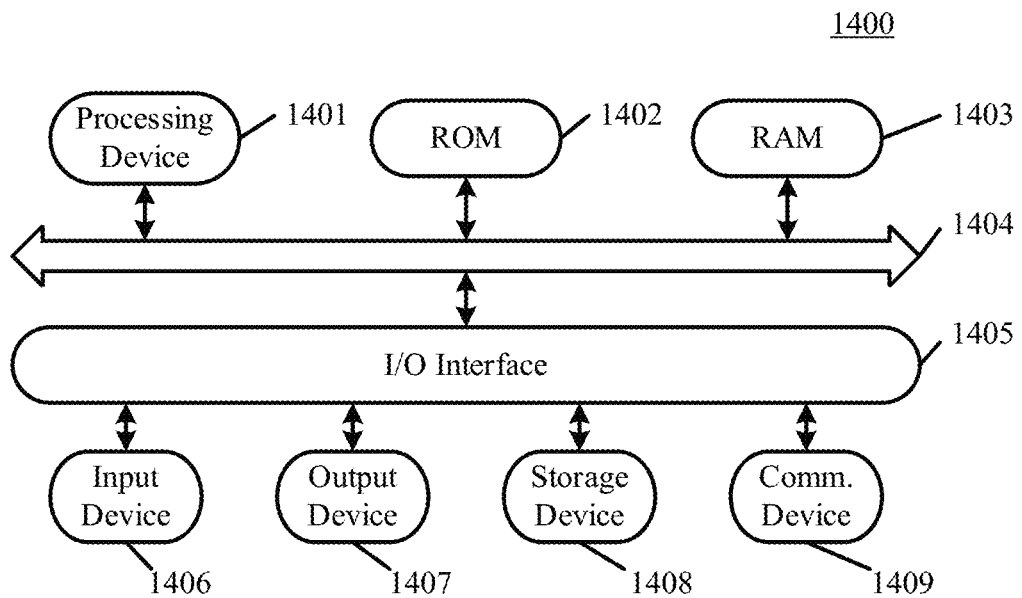
FIG. 14 is a schematic diagram showing a structure of an electronic device for video processing according to yet another embodiment of the present disclosure.

Reference is now made to FIG. 14, which is a schematic diagram showing an electronic device 1400 adapted to implement the embodiments of the present disclosure. The electronic device according to the embodiment of the present disclosure may include, but not limited to, a mobile terminal such as a mobile phone, a laptop computer, a digital broadcast receiver, a Personal Digital Assistant (PDA), a tablet computer or PAD, a Portable Multimedia Player (PMP), or a vehicle-mounted terminal (e.g., a vehicle-mounted navigation terminal), or a fixed terminal such as a digital TV, a desktop computer, etc. The electronic device illustrated in FIG. 14 is exemplary only, and should not be construed as limiting the function and scope of use of the embodiments of the present disclosure.

The electronic device includes a memory and a processor. Here the processor may be referred to as a processing device 1401 below. The memory may include at least one of a Read-Only Memory (ROM) 1402, a Random Access Memory (RAM) 1403, and a storage device 1408 as described below. In particular, as illustrated in FIG. 14, the electronic device 1400 may include a processing device (such as a central processing unit, a graphics processing unit, etc.) 1401, which may perform various appropriate actions and processes in accordance with programs stored in a Read Only Memory (ROM) 1402 or loaded from a storage device 1408 into a Random Access Memory (RAM) 1403. In the RAM 1403, various programs and data required for operation of the electronic device 1400 may also be stored. The processing device 1401, the ROM 1402, and the RAM 1403 are connected to each other through a bus 1404. An Input/Output (I/O) interface 1405 is also connected to the bus 1404.

Generally, the following devices may be connected to the I/O interface 1405: an input device 1406 including, for example, a touch screen, a touch pad, a keyboard, a mouse, a camera, a microphone, an accelerometer, a gyroscope, etc.; an output device 1407 including, for example, a Liquid Crystal Display (LCD), a speaker, an oscillator, etc.; the storage device 1408 including, for example, a magnetic tape or a hard disk; and a communication device 1409. The communication device 1409 may allow the electronic device 1400 to perform wireless or wired communication with other devices for data exchange. Although FIG. 14 illustrates the electronic device 1400 having various devices, it can be appreciated that it is not necessary to implement or provide all the illustrated devices. Alternatively, more or fewer devices may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a non-transitory computer-readable storage medium. The computer program includes program codes for implementing the method illustrated in any of the flowcharts. In these embodiments, the computer program may be downloaded and installed from a network through the communication device 1409, or installed from the storage device 1408, or installed from the ROM 1402. When the computer program is executed by the processing device 1401, the above-mentioned functions defined in the methods according to the embodiments of the present disclosure are performed.

It is to be noted that the above non-transitory computer-readable storage medium in the present disclosure may be a computer-readable storage medium. The computer-readable storage medium may be, but not limited to, for example, an electrical, magnetic, optical, electromagnetic, infrared, or semiconductor system, apparatus, or device, or any combination thereof. More specific examples of the non-transitory computer-readable storage medium may include, but not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the non-transitory computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable storage medium other than the computer-readable storage medium, which may transmit, propagate, or transfer programs used by or used with an instruction execution system, apparatus or device. The program codes stored on the computer-readable storage medium may be transmitted via any appropriate medium, including but not limited to electric cable, optical cable, Radio Frequency (RF), or any suitable combination thereof.

In some embodiments, a client and a server can use any currently known or future developed network protocol, such as HyperText Transfer Protocol (HTTP), for communication, and can interconnect with digital data communication in any form or medium (e.g., communication networks). Examples of communication networks include Local Area Network (LAN), Wide Area Network (WAN), Inter-network (e.g., Internet), and peer-to-peer network (e.g., ad hoc peer-to-peer networks), as well as any currently known or future developed network.

The above non-transitory computer-readable storage medium may be included in the above electronic device; or may be standalone without being assembled into the electronic device.

The above non-transitory computer-readable storage medium may carry one or more programs which, when executed by the electronic device, cause the electronic device to: display, when a predetermined application program enters a shooting mode, a predetermined shooting interface on a current interface of the application program, the shooting interface having a predetermined initial background; obtain an image frame of a target object and the initial background; combine the image frame as a foreground with the initial background for displaying in the shooting interface; start, in response to receiving a first shooting start instruction, generation of video data based on the image frame and the initial background; and stop, in response to receiving a first shooting stop instruction, generation of video data to obtain first video data as generated.

The computer program codes for implementing the operations according to the embodiments of the present disclosure may be written in one or more programming languages or any combination thereof. The programming languages may include, but not limited to, object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any type of network, including a Local Area Network (LAN) or a Wide Area Network (WAN), or to an external computer (e.g., over the Internet by using an Internet service provider).

The flowcharts and block diagrams in the figures illustrate the architecture, functionality, and operation of possible implementations of the systems, methods and computer program products according to various embodiments of the present disclosure. In this regard, each block in the flowchart or block diagram may represent a module, a program segment, or a portion of codes that contains one or more executable instructions for implementing the specified logical functions. It should also be noted that, in some alternative implementations, the functions shown in the blocks may occur in other orders than those shown in the figures. For example, two blocks shown in succession may, in fact, be executed substantially concurrently, or the blocks may sometimes be executed in the reverse order, depending on the functionality involved. It is also to be noted that each block in the block diagrams and/or flowcharts, and combinations of blocks in the block diagrams and/or flowcharts, can be implemented in dedicated hardware-based systems that perform the specified functions or operations, or can be implemented in a combination of dedicated hardware and computer instructions.

The modules or units involved in the embodiments of the present disclosure may be implemented in software or hardware. Here, the names of the modules or units do not constitute any limitation of the units themselves under certain circumstances.

The functions described above may be performed, at least in part, by one or more hardware logic components. For example, as non-limiting examples, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and the like.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. The machine-readable medium may include, but not limited to, electronic, magnetic, optical, electromagnetic, infrared, or semiconductor system, apparatus, or device, or any suitable combination thereof. More specific examples of machine-readable storage medium may include one or more wire-based electrical connection, portable computer disk, hard disk, Random Access Memory (RAM), Read Only Memory (ROM), Erasable Programmable Read Only Memory (EPROM or flash memory), optical fiber, Compact Disk Read Only Memory (CD-ROM), optical storage device, magnetic storage device, or any suitable combination thereof.

According to one or more embodiments of the present disclosure, [Example 1] provides a video processing method, including: displaying, when a predetermined application program enters a shooting mode, a predetermined shooting interface on a current interface of the application program, the shooting interface having a predetermined initial background; obtaining an image frame of a target object and the initial background; combining the image frame as a foreground with the initial background and displaying the image frame and the initial background on the shooting interface; starting, in response to receiving a first shooting start instruction, generation of video data based on the image frame and the initial background; and stopping, in response to receiving a first shooting stop instruction, generation of video data to obtain first video data as generated.

According to an embodiment of the present disclosure, a predetermined background preview window is further displayed in the shooting interface, and the background preview window is used to display candidate backgrounds for replacing the initial background. The candidate backgrounds include image backgrounds and video backgrounds. The processing method further includes: obtaining, in response to receiving a selection instruction for one candidate background, a target candidate background based on the one candidate background; replacing the initial background in the shooting interface with the target candidate background; and combining the image frame as the foreground with the target candidate background for displaying in the shooting interface.

According to an embodiment of the present disclosure, the one candidate background is a video background, and the operation of obtaining the target candidate background based on the one candidate background includes: displaying a predetermined video editing interface, and displaying the video background in the video editing interface; receiving an editing instruction for the video background, and in response to the editing instruction, editing the video background to obtain a preview of the edited video background; and obtaining, in response to receiving a confirmation instruction for the preview of the edited video background, the edited video background as the target candidate background.

According to an embodiment of the present disclosure, the processing method further includes: starting, in response to receiving a second shooting start instruction, generation of video data based on the image frame and the target candidate background; and stopping, in response to receiving a second shooting stop instruction, generation of video data to obtain second video data as generated.

According to an embodiment of the present disclosure, the operation of obtaining the image frame of the target object includes: obtaining an image frame using a predetermined image capturing device; and extracting, in response to detecting the target object in the image frame, the target object from the image frame to obtain the image frame of the target object.

According to an embodiment of the present disclosure, the processing method further includes: exiting the shooting mode in response to receiving a shooting completion instruction, and splicing the first video data and the second video data to obtain final target video data.

According to one or more embodiments of the present disclosure, [Example 2] provides the apparatus of Example 1, including: a display module configured to display, when a predetermined application program enters a shooting mode, a predetermined shooting interface in a current interface of the application program, the shooting interface having a predetermined initial background; an obtaining module configured to obtain an image frame of a target object and the initial background; the display module further configured to combine the image frame as a foreground with the initial background for displaying in the shooting interface; a receiving module configured to receive a first shooting start instruction and a first shooting stop instruction; a generating module configured to start generation of video data based on the image frame and the initial background; and a stopping module configured to stop generation of video data to obtain first video data as generated.

According to an embodiment of the present disclosure, a predetermined background preview window is further displayed in the shooting interface, and the background preview window is used to display candidate backgrounds for replacing the initial background. The candidate backgrounds include image backgrounds and video backgrounds. The receiving module is further configured to receive a selection instruction for one candidate background. The video processing apparatus further includes: a processing module configured to obtain a target candidate background based on the one candidate background; a replacing module configured to replace the initial background in the shooting interface with the target candidate background; and the display module further configured to combine the image frame as the foreground with the target candidate background for displaying in the shooting interface.

According to an embodiment of the present disclosure, the processing module may include: a display sub-module configured to display a predetermined video editing interface, and display the video background in the video editing interface; an editing sub-module configured to receive an editing instruction for the video background, and in response to the editing instruction, edit the video background to obtain a preview of the edited video background; and a determining sub-module configured to obtain, in response to receiving a confirmation instruction for the preview of the edited video background, the edited video background as the target candidate background.

According to an embodiment of the present disclosure, the receiving module is further configured to receive a second shooting start instruction. The generating module is further configured to start generation of video data based on the image frame and the target candidate background. The receiving module is further configured to receive a second shooting stop instruction. The stopping module is further configured to stop generation of video data to obtain second video data as generated.

According to an embodiment of the present disclosure, the obtaining module may include: an obtaining sub-module configured to obtain an image frame using a predetermined image capturing device; and an extracting sub-module configured to extract, in response to detecting the target object in the image frame, the target object from the image frame to obtain the image frame of the target object.

According to an embodiment of the present disclosure, the receiving module is further configured to receive a shooting completion instruction, and the apparatus may further include: a splicing module configured to exit the shooting mode and splice the first video data and the second video data to obtain final target video data.

The above description is merely an illustration of some preferred embodiments of the present disclosure and the technical principles as used. Those skilled in the art should understand that the scope of disclosure involved in the present disclosure is not limited to the technical solutions formed by the specific combinations of the above technical features, and should also cover other technical solutions formed by any combination of the above technical features and their equivalent features without departing from the above disclosed concept, e.g., technical solutions formed by replacing the above features with the technical features disclosed in the present disclosure (but not limited to being disclosed in the present disclosure) with similar functions.

Additionally, although operations are depicted in a particular order, this should not be construed as the operations being necessarily performed in the particular order as shown or in a sequential order. Under certain circumstances, multi-task and parallel processing may be advantageous. Likewise, although the above discussion contains several implementation-specific details, these should not be construed as limitations on the scope of the present disclosure. Certain features that are described in the context of separate embodiments can also be implemented in combination in a single embodiment. Alternatively, various features that are described in the context of a single embodiment can also be implemented in multiple embodiments separately or in any suitable sub-combination.

Although the subject matter has been described in language specific to structural features and/or logical actions of method, it is to be understood that the subject matter defined in the appended claims is not necessarily limited to the specific features or actions described above. Rather, the specific features and actions described above are merely exemplary forms of implementing the claims.

What is claimed is:

1. A video processing method, comprising:
displaying an interface element on an initial interface of an application program, wherein the initial interface of the application program is displayed once the application program is initiated by a user, wherein the initial interface of the application program comprises a plurality of videos and the interface element, wherein the interface element is configured to trigger an instruction to enter a shooting mode, and wherein the shooting mode is configured to shoot a video using at least one predetermined background;
loading a shooting interface in response to receiving user input on the interface element, wherein a predetermined background preview window is further displayed in the shooting interface, and wherein the predetermined background preview window is configured to display candidate backgrounds for replacing an initial predetermined background;
obtaining the initial predetermined background from a predetermined video background resource library while loading the shooting interface;
displaying, when the application program enters the shooting mode, the initial predetermined background and the shooting interface;
obtaining an image frame of a target object via an image capturing device;
generating a video using the image frame as a foreground and using the initial predetermined background as a background, wherein the generating a video further comprises:
starting, in response to receiving a first shooting start instruction, generation of video data based on the image frame and the initial predetermined background, and
stopping, in response to receiving a first shooting stop instruction, the generation of video data to obtain first video data.

2. The video processing method according to claim 1, wherein the candidate backgrounds comprise image backgrounds and video backgrounds, and the processing method further comprises:
obtaining, in response to receiving a selection instruction for one candidate background, a target candidate background based on the one candidate background;
replacing the initial predetermined background in the shooting interface with the target candidate background; and
combining the image frame as the foreground with the target candidate background for displaying in the shooting interface.

3. The video processing method according to claim 2, wherein the one candidate background is a video background, and said obtaining the target candidate background based on the one candidate background comprises:

displaying a predetermined video editing interface, and displaying the video background in the video editing interface;

receiving an editing instruction for the video background, and in response to the editing instruction, editing the video background to obtain a preview of the edited video background; and obtaining, in response to receiving a confirmation instruction for the preview of the edited video background, the edited video background as the target candidate background.

4. The video processing method according to claim 2, further comprising:

starting, in response to receiving a second shooting start instruction, generation of video data based on the image frame and the target candidate background; and stopping, in response to receiving a second shooting stop instruction, generation of video data to obtain second video data as generated.

5. The video processing method according to claim 1, wherein said obtaining the image frame of the target object comprises:

obtaining an image frame using a predetermined image capturing device; and extracting, in response to detecting the target object in the image frame, the target object from the image frame to obtain the image frame of the target object.

6. The video processing method according to claim 4, further comprising:

exiting the shooting mode in response to receiving a shooting completion instruction, and splicing the first video data and the second video data to obtain final target video data.

7. An electronic device, comprising:

a memory having operation instructions stored thereon;

a processor configured to invoke the operation instructions to:

display an interface element on an initial interface of an application program, wherein the initial interface of the application program is displayed once the application program is initiated by a user, wherein the initial interface of the application program comprises a plurality of videos and the interface element, wherein the interface element is configured to trigger an instruction to enter a shooting mode, and wherein the shooting mode is configured to shoot a video using at least one predetermined background;

load a shooting interface in response to receiving user input on the interface element, wherein a predetermined background preview window is further displayed in the shooting interface, and wherein the predetermined background preview window is configured to display candidate backgrounds for replacing an initial predetermined background;

obtain the initial predetermined background from a predetermined video background resource library while loading the shooting interface;

display, when the application program enters the shooting mode, the initial predetermined background and the shooting interface;

obtain an image frame of a target object via an image capturing device;

generate a video using the image frame as a foreground and using the initial predetermined background as a background, wherein generating a video further comprises:

starting, in response to receiving a first shooting start instruction, generation of video data based on the image frame and the initial predetermined background, and stopping, in response to receiving a first shooting stop instruction, the generation of video data to obtain first video data; and a bus configured to connect the processor and the memory.

8. The electronic device according to claim 7, wherein the candidate backgrounds comprise image backgrounds and video backgrounds, and the processor is further configured to invoke the operation instructions to:

obtain, in response to receiving a selection instruction for one candidate background, a target candidate background based on the one candidate background;

replace the initial predetermined background in the shooting interface with the target candidate background; and combine the image frame as the foreground with the target candidate background for displaying in the shooting interface.

9. The electronic device according to claim 8, wherein the one candidate background is a video background, and said obtaining the target candidate background based on the one candidate background comprises:

displaying a predetermined video editing interface, and displaying the video background in the video editing interface;

receiving an editing instruction for the video background, and in response to the editing instruction, editing the video background to obtain a preview of the edited video background; and obtaining, in response to receiving a confirmation instruction for the preview of the edited video background, the edited video background as the target candidate background.

10. The electronic device according to claim 8, wherein the processor is further configured to invoke the operation instructions to:

start, in response to receiving a second shooting start instruction, generation of video data based on the image frame and the target candidate background; and stop, in response to receiving a second shooting stop instruction, generation of video data to obtain second video data as generated.

11. The electronic device according to claim 7, wherein said obtaining the image frame of the target object comprises:

obtaining an image frame using a predetermined image capturing device; and extracting, in response to detecting the target object in the image frame, the target object from the image frame to obtain the image frame of the target object.

12. The electronic device according to claim 10, wherein the processor is further configured to invoke the operation instructions to:

exit the shooting mode in response to receiving a shooting completion instruction, and splice the first video data and the second video data to obtain final target video data.

13. A non-transitory computer-readable storage medium having computer instructions stored thereon, wherein the computer instructions, when executed on a computer, cause the computer to:

display an interface element on an initial interface of an application program, wherein the initial interface of the application program is displayed once the application program is initiated by a user, wherein the initial interface of the application program comprises a plurality of videos and the interface element, wherein the interface element is configured to trigger an instruction to enter a shooting mode, and wherein the shooting mode is configured to shoot a video using at least one predetermined background;

load a shooting interface in response to receiving user input on the interface element, wherein a predetermined background preview window is further displayed in the shooting interface, and wherein the predetermined background preview window is configured to display candidate backgrounds for replacing an initial predetermined background;

obtain the initial predetermined background from a predetermined video background resource library while loading the shooting interface;

display, when the application program enters the shooting mode, the initial predetermined background and the shooting interface;

obtain an image frame of a target object via an image capturing device;

generate a video using the image frame as a foreground and using the initial predetermined background as a background, wherein generating a video further comprises:
starting, in response to receiving a first shooting start instruction, generation of video data based on the image frame and the initial predetermined background, and
stopping, in response to receiving a first shooting stop instruction, the generation of video data to obtain first video data.

14. The non-transitory computer-readable storage medium according to claim 13, wherein the candidate backgrounds comprise image backgrounds and video backgrounds, and the computer instructions, when executed on a computer, further cause the computer to:
obtain, in response to receiving a selection instruction for one candidate background, a target candidate background based on the one candidate background;
replace the initial predetermined background in the shooting interface with the target candidate background; and
combine the image frame as the foreground with the target candidate background for displaying in the shooting interface.

15. The non-transitory computer-readable storage medium according to claim 14, wherein the one candidate background is a video background, and said obtaining the target candidate background based on the one candidate background comprises:
displaying a predetermined video editing interface, and displaying the video background in the video editing interface;
receiving an editing instruction for the video background, and in response to the editing instruction, editing the video background to obtain a preview of the edited video background; and
obtaining, in response to receiving a confirmation instruction for the preview of the edited video background, the edited video background as the target candidate background.

16. The non-transitory computer-readable storage medium according to claim 14, wherein the computer instructions, when executed on a computer, further cause the computer to:
start, in response to receiving a second shooting start instruction, generation of video data based on the image frame and the target candidate background; and
stop, in response to receiving a second shooting stop instruction, generation of video data to obtain second video data as generated.

17. The non-transitory computer-readable storage medium according to claim 13, wherein said obtaining the image frame of the target object comprises:
obtaining an image frame using a predetermined image capturing device; and
extracting, in response to detecting the target object in the image frame, the target object from the image frame to obtain the image frame of the target object.

18. The non-transitory computer-readable storage medium according to claim 16, wherein the computer instructions, when executed on a computer, further cause the computer to:
exit the shooting mode in response to receiving a shooting completion instruction, and splice the first video data and the second video data to obtain final target video data.

* * * * *